United States Patent
Ban, Jr. et al.

(10) Patent No.: US 10,131,272 B2
(45) Date of Patent: Nov. 20, 2018

(54) WARNING LIGHT SYSTEM WITH DEDICATED WINDSHIELD HEATING ELEMENT

(71) Applicant: FORD GLOBAL TECHNOLOGIES, LLC, Dearborn, MI (US)

(72) Inventors: John Steven Ban, Jr., Bloomfield Hills, MI (US); Matthew Cramer Mullen, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 15/212,384

(22) Filed: Jul. 18, 2016

(65) Prior Publication Data
US 2018/0015871 A1    Jan. 18, 2018

(51) Int. Cl.
| | |
|---|---|
| *B60Q 1/26* | (2006.01) |
| *B60S 1/04* | (2006.01) |
| *G08B 5/38* | (2006.01) |
| *B60Q 1/28* | (2006.01) |
| *B60Q 1/50* | (2006.01) |
| *F21S 45/60* | (2018.01) |

(52) U.S. Cl.
CPC ........... *B60Q 1/26* (2013.01); *B60Q 1/28* (2013.01); *B60Q 1/50* (2013.01); *B60S 1/04* (2013.01); *F21S 45/60* (2018.01); *G08B 5/38* (2013.01)

(58) Field of Classification Search
CPC .............. B60Q 1/26; B60S 1/04; G08B 5/38
See application file for complete search history.

(56) References Cited

U.S. PATENT DOCUMENTS

| | | | | |
|---|---|---|---|---|
| 3,665,392 A | * | 5/1972 | Annas | B60Q 1/26 340/479 |
| 4,276,483 A | * | 6/1981 | Hayden | G04F 1/005 307/10.1 |
| 4,488,141 A | * | 12/1984 | Ohlenforst | B60Q 1/302 156/99 |
| 4,543,466 A | * | 9/1985 | Ramus | B32B 17/10036 219/203 |
| 4,668,270 A | * | 5/1987 | Ramus | B32B 17/10174 219/203 |
| 4,725,710 A | * | 2/1988 | Ramus | B32B 17/10174 219/203 |
| 4,768,037 A | * | 8/1988 | Inaba | B32B 17/10 343/713 |
| 4,786,784 A | * | 11/1988 | Nikodem | B32B 17/10036 219/543 |
| 4,894,514 A | * | 1/1990 | Delvin | B32B 17/10036 219/203 |
| 4,918,288 A | * | 4/1990 | Carter | B32B 17/10036 219/203 |
| 5,111,329 A | * | 5/1992 | Gajewski | B32B 17/10036 359/260 |

(Continued)

*Primary Examiner* — Joseph Feild
*Assistant Examiner* — Rufus Point
(74) *Attorney, Agent, or Firm* — Jason Rogers; King & Schickli, PLLC

(57) ABSTRACT

A warning light system that is provided for a motor vehicle includes a warning light assembly and a heating element carried on a windshield of the motor vehicle, vehicle forward of the warning light assembly. The heating element is dedicated to providing a clear sight path to the warning light and thereby increasing its effectiveness. A related method is also provided.

14 Claims, 4 Drawing Sheets

(56) References Cited

U.S. PATENT DOCUMENTS

| | | | | |
|---|---|---|---|---|
| 5,414,240 A * | 5/1995 | Carter | B32B 17/10036 | 219/203 |
| 5,420,774 A * | 5/1995 | Wilson | B60Q 1/2611 | 362/217.02 |
| 5,743,631 A * | 4/1998 | Bigham | B60S 1/026 | 362/294 |
| 5,798,499 A * | 8/1998 | Shibata | H05B 3/84 | 219/203 |
| 5,949,150 A * | 9/1999 | MacDonald | B60S 1/0822 | 15/DIG. 15 |
| 5,987,216 A | 11/1999 | Krug | | |
| 6,067,171 A * | 5/2000 | Yamada | H04N 1/00408 | 358/405 |
| 6,180,921 B1 * | 1/2001 | Boaz | B32B 17/10036 | 219/203 |
| 6,472,636 B1 * | 10/2002 | Baldwin | B32B 17/10183 | 219/203 |
| 6,511,216 B2 * | 1/2003 | Strickland | B60Q 1/2611 | 362/490 |
| 6,563,086 B1 * | 5/2003 | Meirndorf | H05B 3/84 | 219/220 |
| 7,126,583 B1 * | 10/2006 | Breed | B60K 35/00 | 345/158 |
| 7,745,838 B2 * | 6/2010 | Lefevre | B32B 17/10018 | 257/88 |
| 7,914,162 B1 * | 3/2011 | Huang | B60L 1/14 | 362/92 |
| 8,044,415 B2 * | 10/2011 | Messere | B32B 17/10 | 257/88 |
| 8,325,029 B2 * | 12/2012 | Brooking | B60Q 1/2611 | 340/463 |
| 8,899,059 B2 * | 12/2014 | Barnes | A61G 3/008 | 62/239 |
| 8,924,076 B2 * | 12/2014 | Boote | B32B 17/10 | 701/36 |
| 9,316,436 B2 * | 4/2016 | Trevett | B60S 1/02 | |
| 2002/0109999 A1 * | 8/2002 | Strickland | B60Q 1/2611 | 362/542 |
| 2005/0047167 A1 * | 3/2005 | Pederson | B60Q 1/2611 | 362/542 |
| 2005/0057941 A1 * | 3/2005 | Pederson | B60Q 1/2611 | 362/542 |
| 2006/0275599 A1 * | 12/2006 | Lefevre | B32B 17/10018 | 428/332 |
| 2009/0114928 A1 * | 5/2009 | Messere | B32B 17/10 | 257/88 |
| 2009/0174541 A1 * | 7/2009 | Girouard | B60Q 1/268 | 340/468 |
| 2010/0085181 A1 * | 4/2010 | Brooking | B60Q 1/2611 | 340/468 |
| 2010/0179725 A1 * | 7/2010 | Boote | B32B 17/10 | 701/36 |
| 2010/0253595 A1 * | 10/2010 | Szczerba | G01C 21/365 | 345/7 |
| 2011/0267833 A1 * | 11/2011 | Verrat-Debailleul | B32B 17/10036 | 362/545 |
| 2013/0298419 A1 * | 11/2013 | Trevett | A42B 3/26 | 34/279 |
| 2014/0083991 A1 * | 3/2014 | Choi | H05B 3/84 | 219/203 |
| 2015/0034621 A1 * | 2/2015 | Timmermann | B60R 11/04 | 219/203 |
| 2015/0035437 A1 * | 2/2015 | Panopoulos | F21V 14/02 | 315/112 |
| 2017/0334366 A1 * | 11/2017 | Sliwa | B60R 11/04 | |

\* cited by examiner

WARNING LIGHT SYSTEM WITH DEDICATED WINDSHIELD HEATING ELEMENT

TECHNICAL FIELD

This document relates generally to the motor vehicle equipment field and, more particularly, to a warning light system having a dedicated windshield heating element to defog, defrost and deice the upper margin of the windshield directly in front of the warning light assembly so as to maintain a clear sight path to the warning light and thereby increasing its effectiveness.

BACKGROUND

Unmarked police vehicles commonly include warning lights that are mounted on the interior of the vehicle adjacent the interface between the windshield and the roof panel. Such lights function the same as an exterior, roof mounted light bar.

Such interior mounted warning lights direct light through the upper margin of the windshield. Significantly, the windshield wipers do not clear this area of the windshield in front of the warning lights from ice and snow buildup. That buildup can render the warning lights ineffective by blocking the warning lights from view.

This document relates to a new and improved warning light system incorporating a dedicated heating circuit to maintain the windshield in front of and adjacent to the warning lights free and clear of ice and snow and thereby maximizing the visibility and effectiveness of the warning lights for enhanced public safety.

SUMMARY

In accordance with the purposes and benefits described herein, a warning light system is provided for a motor vehicle. That warning light system includes a warning light assembly and a heating element carried on a windshield of the motor vehicle, vehicle forward of the warning light assembly.

The warning light assembly may include a light source and a lens that directs light from the light source through a designated portion of the windshield. That designated portion of the windshield may be provided along an upper margin of the windshield above an area of the windshield cleared by windshield wipers of the motor vehicle.

The warning light assembly may also include a roof mounting bracket to secure the warning light assembly to a roof panel of the motor vehicle. The heating element may comprise a decal with a resistance heating element. That heating element may also have a shape corresponding to the front face of the lens.

The warning light system may also include a controller. That controller may be configured to activate the heating element in response to activation of a windshield defroster of the motor vehicle. Alternatively, that controller may be configured to activate the heating element in response to data indicating (a) the presence of falling precipitation and (b) an ambient temperature below a predetermined threshold temperature.

In accordance with still another aspect, a motor vehicle is provided comprising: (a) a windshield, (b) a windshield wiper system for sweeping a field of the windshield, (c) a heating element attached to an upper margin of the windshield above that field, and (d) a warning light assembly. The warning light assembly may include a light source and a lens for directing light from the light source through the upper margin of the windshield and the heating element.

The warning light assembly may also include a roof mounting bracket. The heating element may be provided vehicle forward and adjacent to the lens. The heating element and the lens may also have a common shape.

The motor vehicle may also include a controller configured to activate the heating element in response to activation of a windshield defroster of the motor vehicle. Alternatively, the motor vehicle may include a controller configured to activate the heating element in response to data indicating: (a) current precipitation and (b) an ambient temperature below a predetermined threshold temperature.

In accordance with yet another aspect, a method is provided of increasing the effectiveness of a warning light assembly positioned in the interior of the motor vehicle. That method may comprise the steps of: (a) energizing a heating element on a windshield of the motor vehicle in front of the warning light assembly, (b) clearing ice, fog or snow from a portion of the windshield in front of the warning light assembly and (c) directing light from the warning light assembly through the portion of the windshield cleared of ice, fog or snow.

The method may further include the step of dedicating the heating element to maintaining a clear sight path through the windshield to the warning light assembly so that light emitted by the warning light assembly is clearly visible to the public.

Further, the method may include the stop of energizing, by a controller, the heating element in response to activation of a windshield defroster. Alternatively, the method may include the step of energizing, by a controller, the heating element in response to: (a) current precipitation and (b) an ambient temperature below a predetermined threshold temperature.

In the following description, there are shown and described several preferred embodiments of the warning light assembly system, the motor vehicle equipped with the warning light system and the related method of increasing the effectiveness of a warning light assembly positioned in an interior of a motor vehicle. As it should be realized, the warning light system, motor vehicle and method are all capable of other, different embodiments and their several details are capable of modification in various, obvious aspects all without departing from the system, motor vehicle and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the warning light system, motor vehicle and related method and together with the description serve to explain certain principles thereof. In the drawing figures.

Reference will now be made in detail to the present preferred embodiments, examples of which are illustrated in the accompanying drawing figures.

DETAILED DESCRIPTION

Figure 1:
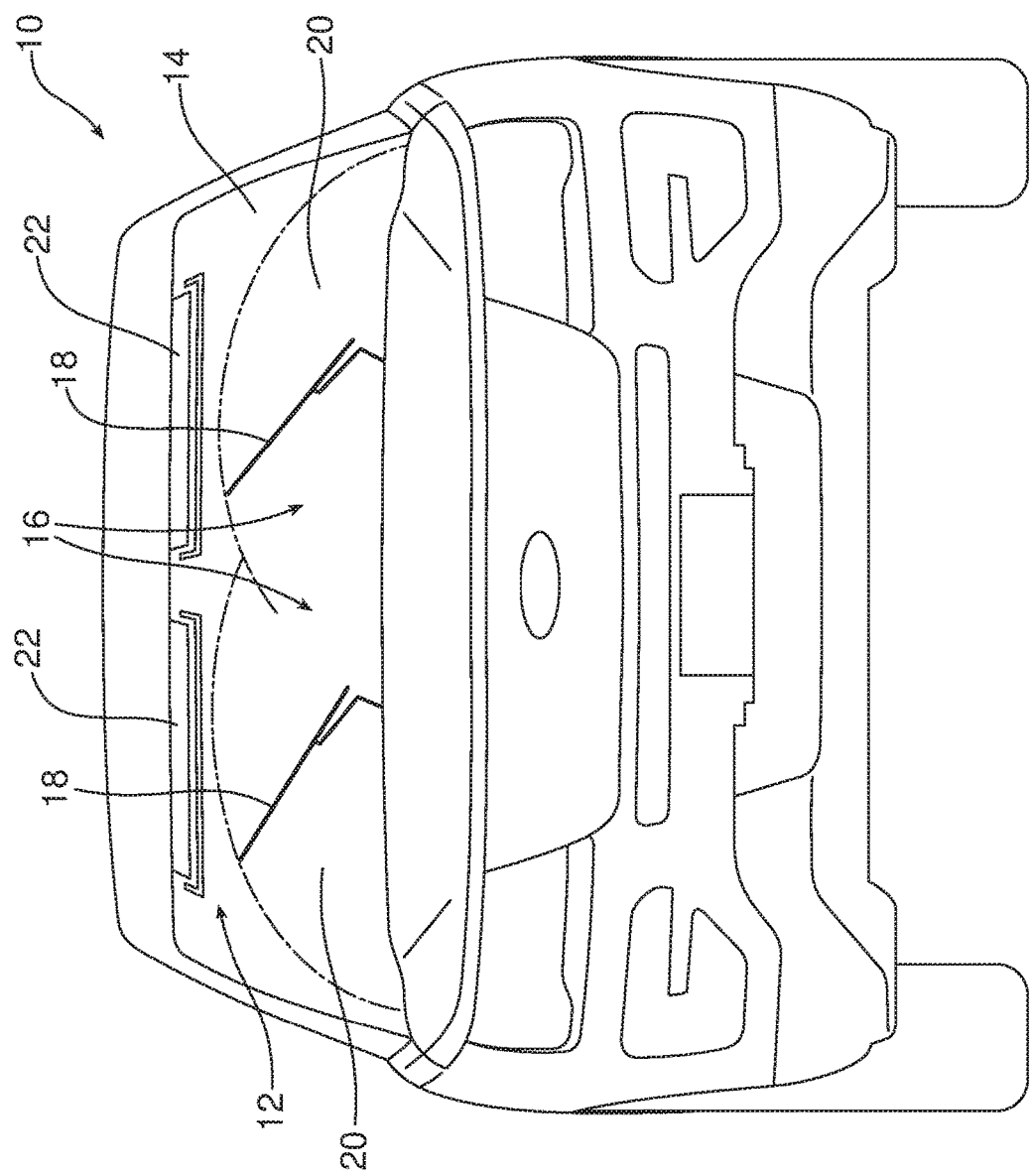
FIG. 1 is a front plan view of a motor vehicle equipped with the warning light system.

Reference is now made to FIG. 1 illustrating a motor vehicle 10 equipped with the warning light system 12. As best illustrated in FIGS. 1 and 2, the motor vehicle 10 includes a windshield 14 and a windshield wiper system 16 including wipers 18 that sweep and clear a field 20 of the windshield.

The warning light system 12 includes a warning light assembly 22 having a mounting bracket 24 for securing the warning light assembly to a roof panel 26 of the motor vehicle 10.

Figure 2:
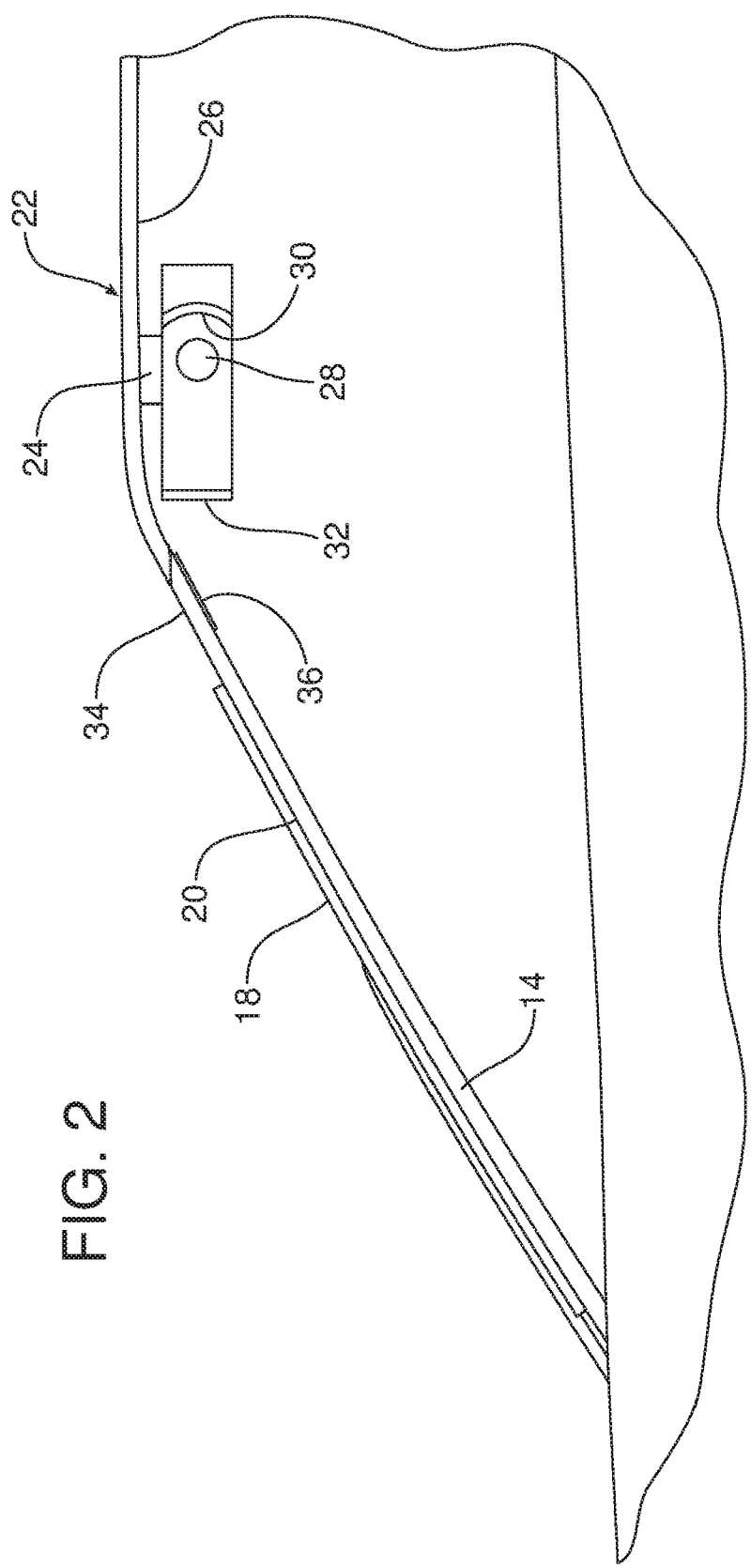
FIG. 2 is a schematic side view illustrating the warning light system including the warning light assembly mounted to a roof panel of the motor vehicle and the heating element carried on the windshield of the motor vehicle.
Figure 3:
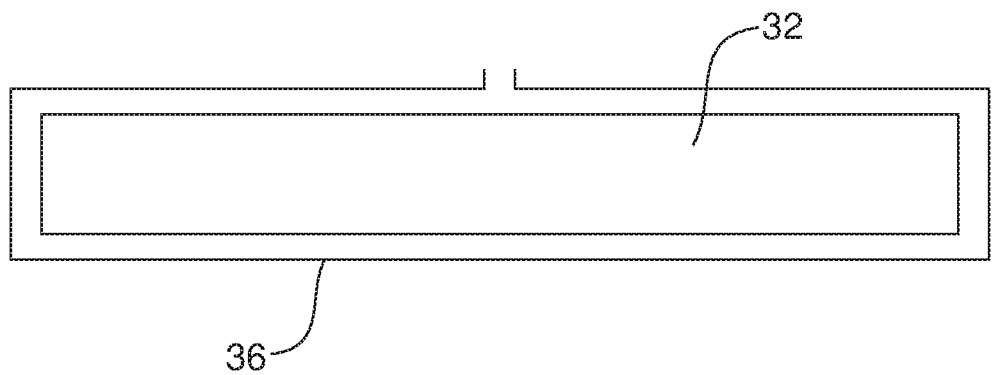
FIGS. 3 and 4 are two schematic front views illustrating two possible embodiments of the warning light system.

As should be appreciated from viewing FIG. 2, the warning light assembly 22 includes a light source 28, a reflector 30 and a lens 32. When activated, light emitted by the light source 28 is concentrated by the reflector 30 and directed through the lens 32 through a designated portion 34 of the windshield 14 vehicle forward of the warning light assembly 22.

In the illustrated embodiment, the warning light assembly 22 is mounted on the roof panel 26 adjacent the interface of the windshield 14 and the roof panel. Thus, the portion 34 through which the light from the light source 28 is directed is at an upper margin of the windshield above the area or field 20 that is cleared by the windshield wipers 18.

Figure 4:
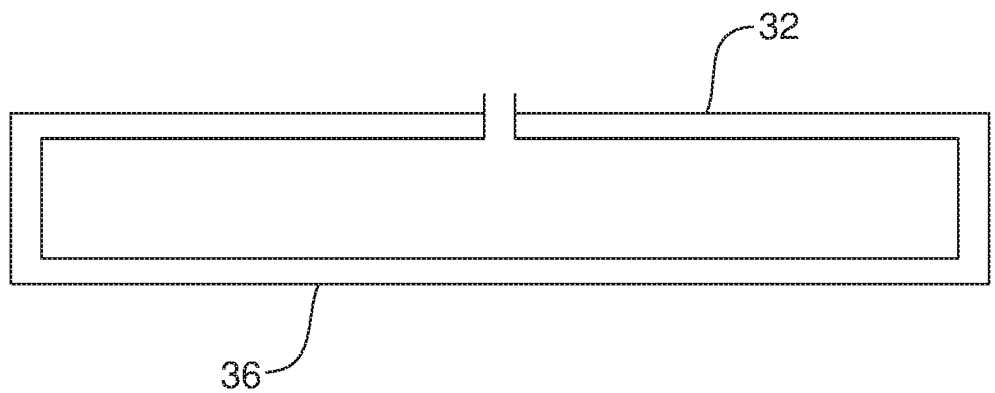
Figure 5:
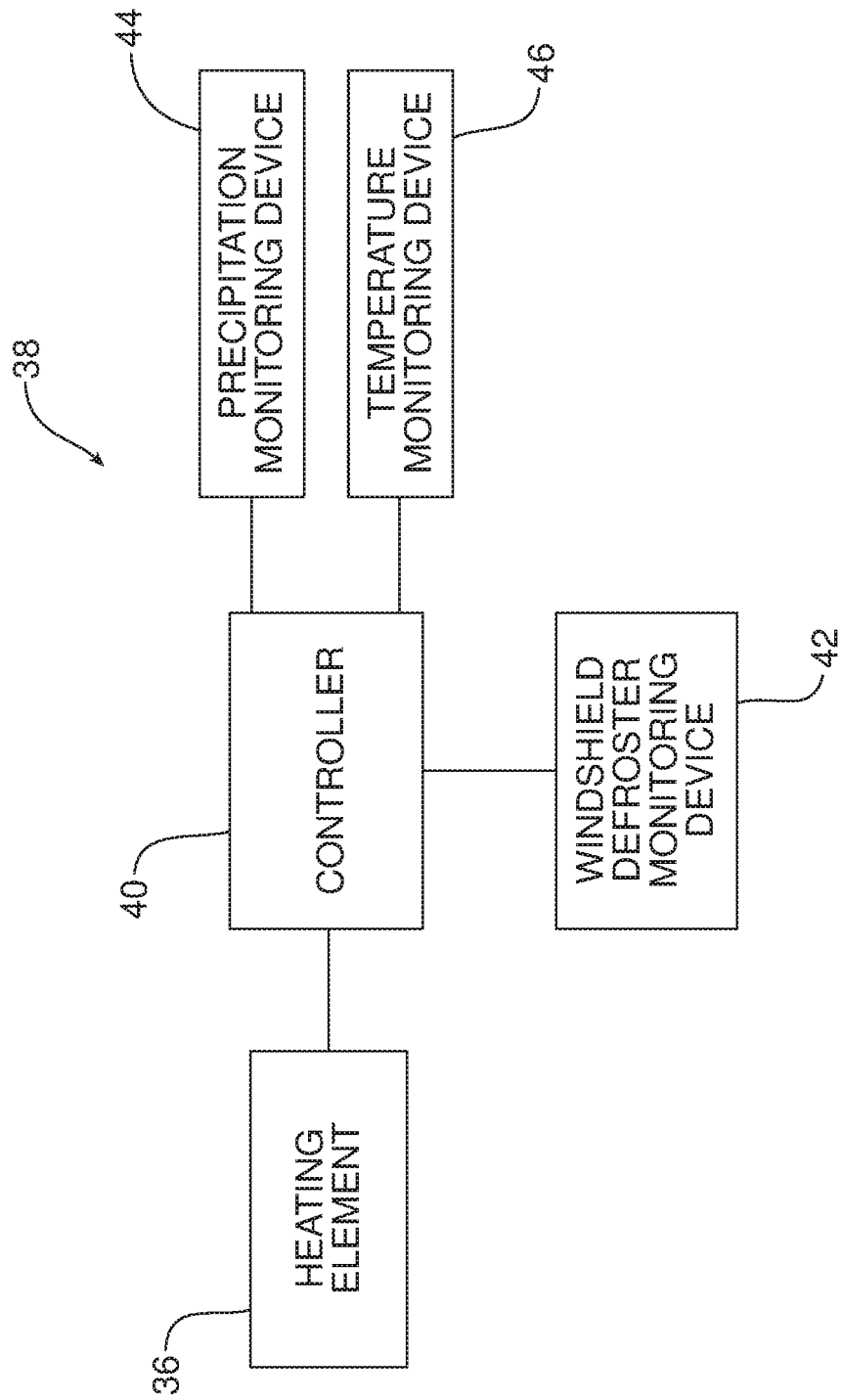
FIG. 5 is a schematic block diagram of the heating circuit of the warning light system.

As should also be appreciated from viewing FIGS. 1-5, the warning light system 12 also includes a heating element 36. The heating element 36 is carried on the windshield 14 of the motor vehicle 10 vehicle forward of the warning light assembly 22. In the illustrated embodiment, the heating element 36 comprises a decal and a resistance heating element. As best illustrated in FIGS. 4 and 5, the lens 32 of the warning light assembly 22 has a front face provided adjacent to and directly behind the heating element 36. Further, the heating element 36 and the lens 32 may share a common shape. As a result light from the light source 28 directed through the lens 32 is also directed through the windshield 14 and the heating element 36. More specifically, in the embodiment illustrated in FIG. 3, the heating element 36 defines a rectangular shape that is slightly larger than the rectangular shape defined by the lens 32. In contrast, in the embodiment illustrated in FIG. 4, the heating element 36 defines a rectangular shape that is slightly smaller than the rectangular shape defined by the lens 32.

Reference is now made to FIG. 5 illustrating a heating circuit 38 for the warning light system 12. That heating circuit 38 incorporates the heating element 36. A controller 40 is connected to the heating element 36. The controller 40 may comprise a computing device such as a dedicated microprocessor or electronic control unit (ECU). In the illustrated embodiment, the controller 40 comprises one or more processors, one or more memories and one or more network interfaces that communicate with each other over a communication bus.

As further illustrated in FIG. 5, the controller 40 may be connected to a windshield defroster monitoring device 42 such as a heating ventilating and air conditioning (HVAC) control module of the motor vehicle 10. Thus, the controller 40 may be configured to activate the heating element 36 in response to activation of the windshield defroster of the motor vehicle 10 based upon data provided to the controller from the windshield defroster monitoring device 42.

As further illustrated in FIG. 5, the controller 40 may also be connected to a precipitation monitoring device 44 and an ambient temperature monitoring device 46. Such a precipitation monitoring device 44 may comprise a rain sensor such as currently provided on motor vehicles equipped with an automatic windshield wiper control system. The ambient temperature monitoring device may be a temperature sensor or other control module capable of providing ambient temperature data to the controller 40. As a consequence, the controller 40 may be configured to activate the heating element 36 in response to data received from the devices 44 and 46 indicating (a) that precipitation is currently falling and (b) an ambient temperature is below a predetermined threshold temperature such as, for example, 1 degree C.

Consistent with the above description, a method is provided of increasing the effectiveness of a warning light assembly 22 positioned in an interior of a motor vehicle 10. That method comprises energizing the heating element 36 on the windshield 14 of the motor vehicle 10 in front of the warning light assembly 22. The method also includes the step of clearing ice, fog or snow from the portion 34 of the windshield 14 in front of the warning light assembly 22 and the step of directing light from the warning light assembly 22 through that portion of the windshield.

Further, the method includes dedicating the heating element 36 to maintaining a clear sight path through the windshield 14 to the light emitted by the warning light source 28/warning light assembly 22.

Still further, the method includes the step of energizing, by the controller 40, the heating element 36 in response to activation of a windshield defroster of the motor vehicle 10. Alternatively, or in addition, the method includes energizing, by the controller 40, the heating element 36 in response to (a) current precipitation (as indicated by the device 44) and (b) an ambient temperature below a predetermined threshold temperature (as indicated by the device 46).

As should be appreciated from the preceding description, the motor vehicle 10 includes a warning light system 12 that incorporates a dedicated heating circuit 38 and dedicated heating element 36 specifically adapted to clear ice, fog or snow from the portion 34 of the windshield 14 in front of the warning light assembly 22 thereby enhancing the visibility of the warning light emitted by the light source 28. This increases the effectiveness of the warning light and enhances public safety.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A warning light system for a motor vehicle, comprising:
   a warning light assembly, wherein said warning light assembly includes a light source and a lens that directs light from said light source through a designated portion of the windshield; and
   a heating element carried on a windshield of the motor vehicle, vehicle forward of said warning light assembly;

wherein said lens has a front face through which said light from said light source is directed through the windshield and said heating element has a shape corresponding to said lens.

2. The warning light system of claim 1, wherein said designated portion is provided along an upper margin of the windshield above an area of the windshield cleared by windshield wipers of said motor vehicle.

3. The warning light system of claim 2, wherein said warning light assembly includes a roof mounting bracket to secure said warning light assembly to a roof panel of the motor vehicle.

4. The warning light system of claim 3, wherein said heating element comprises a decal and a resistance heating element.

5. The warning light system of claim 1, further including a controller configured to activate said heating element in response to activation of a windshield defroster of the motor vehicle.

6. The warning light system of claim 1, further including a controller configured to activate said heating element in response to data indicating (a) current precipitation and (b) an ambient temperature below a predetermined threshold temperature.

7. A motor vehicle, comprising:
a windshield;
a windshield wiper system for sweeping a field of said windshield;
a heating element attached to an upper margin of said windshield above said field; and
a warning light assembly including a light source and a lens for directing light from said light source through said upper margin of said windshield and said heating element;
wherein the heating element is vehicle forward of and adjacent to said lens; and
wherein said heating element and said lens have a common shape.

8. The motor vehicle of claim 7, wherein said warning light assembly includes a roof mounting bracket.

9. The motor vehicle of claim 7, further including a controller configured to activate said heating element in response to activation of a windshield defroster of the motor vehicle.

10. The motor vehicle of claim 7, further including a controller configured to activate said heating element in response to data indicating (a) current precipitation and (b) an ambient temperature below a predetermined threshold temperature.

11. A method of increasing effectiveness of a warning light assembly positioned in an interior of a motor vehicle, said warning light assembly including a lens, the method comprising:
energizing a heating element on the windshield of the motor vehicle in front of the warning light assembly;
clearing ice, fog or snow from a portion of the windshield in front of warning light assembly; and
directing light from said warning light assembly, through said lens, and through said portion of said windshield;
wherein said heating element has a shape corresponding to said lens.

12. The method of claim 11, including dedicating said heating element to maintaining a clear sight path through said windshield to said warning light assembly so that light emitted by said warning light assembly is highly visible to others outside the motor vehicle.

13. The method of claim 12, including energizing, by a controller, said heating element in response to activation of a windshield defroster.

14. The method of claim 12, including energizing, by a controller, said heating element in response to (a) current precipitation and (b) an ambient temperature below a predetermined threshold temperature.

* * * * *